United States Patent
Phillips

(10) Patent No.: US 7,175,343 B2
(45) Date of Patent: *Feb. 13, 2007

(54) MULTI-ELEMENT THERMOCOUPLE

(75) Inventor: Richard W. Phillips, Eagan, MN (US)

(73) Assignee: Rosemount Aerospace, Burnsville, MN (US)

( * ) Notice: Subject to any disclaimer, the term of this patent is extended or adjusted under 35 U.S.C. 154(b) by 10 days.

This patent is subject to a terminal disclaimer.

(21) Appl. No.: 11/299,723

(22) Filed: Dec. 13, 2005

(65) Prior Publication Data

US 2006/0227849 A1    Oct. 12, 2006

Related U.S. Application Data

(63) Continuation of application No. 10/851,248, filed on May 24, 2004, now Pat. No. 7,044,638.

(51) Int. Cl.
*G01K 7/02* (2006.01)

(52) U.S. Cl. ..................................... 374/180

(58) Field of Classification Search ........ 374/179–182; 136/200, 205, 230, 235
See application file for complete search history.

(56) References Cited

U.S. PATENT DOCUMENTS

| | | | |
|---|---|---|---|
| 2,059,480 A | 11/1936 | Obermaier | |
| 3,307,402 A | 3/1967 | Richardson | |
| 3,514,998 A | 6/1970 | Benson | |
| 3,990,308 A | 11/1976 | McCormick et al. | |
| 4,002,500 A | 1/1977 | Wang | |
| 4,075,036 A | 2/1978 | Lysikov et al. | |
| 4,423,967 A | 1/1984 | Mouton | |
| 4,460,225 A | 7/1984 | Moore et al. | |
| 4,682,898 A | 7/1987 | Janssen | |
| 4,718,777 A | 1/1988 | Mydynski et al. | |
| 4,936,690 A | 6/1990 | Goetzinger | |
| 5,038,303 A | 8/1991 | Kimura | |

(Continued)

FOREIGN PATENT DOCUMENTS

DE    272488    4/1912

(Continued)

OTHER PUBLICATIONS

French Search Report for French Application No. 0551234 dated Nov. 30, 2005.

*Primary Examiner*—G. Bradley Bennett
(74) *Attorney, Agent, or Firm*—Womble Carlyle

(57) ABSTRACT

A multi-element thermocouple circuit includes at least two temperature measuring junctions. A first temperature measuring junction is formed by first and second thermoelements, each of the first and second thermoelements being formed of a noble metal or a noble metal alloy. The second temperature measuring junction, which connects to the distal end of the first thermoelement, is formed by third and fourth thermoelements, neither of which is formed from a noble metal or a noble alloy. A fifth thermoelement connects to the distal end of the second thermoelement and is formed of the same material as the fourth thermoelement. During operation, the distal ends of the third and fourth thermoelements define therebetween a first voltage difference corresponding to a temperature at the second temperature measuring junction, while the distal ends of the fourth and fifth thermoelements define a second voltage difference from which a temperature at the first temperature measuring junction may be obtained.

23 Claims, 8 Drawing Sheets

U.S. PATENT DOCUMENTS

| | | |
|---|---|---|
| 5,713,668 A | 2/1998 | Lunghofer et al. |
| 6,239,351 B1 | 5/2001 | Hall, Jr. |
| 6,270,253 B1 | 8/2001 | Keller |
| 6,344,747 B1 | 2/2002 | Lunghofer et al. |
| 6,425,687 B1 | 7/2002 | Kulczyk |
| 6,487,515 B1 | 11/2002 | Ghoshal |
| 6,550,963 B2 | 4/2003 | Daily et al. |
| 6,632,017 B1 | 10/2003 | Cress |
| 7,044,638 B2 * | 5/2006 | Phillips ...................... 374/180 |

FOREIGN PATENT DOCUMENTS

DE 10 2005 023 869.6-52    5/2006

* cited by examiner

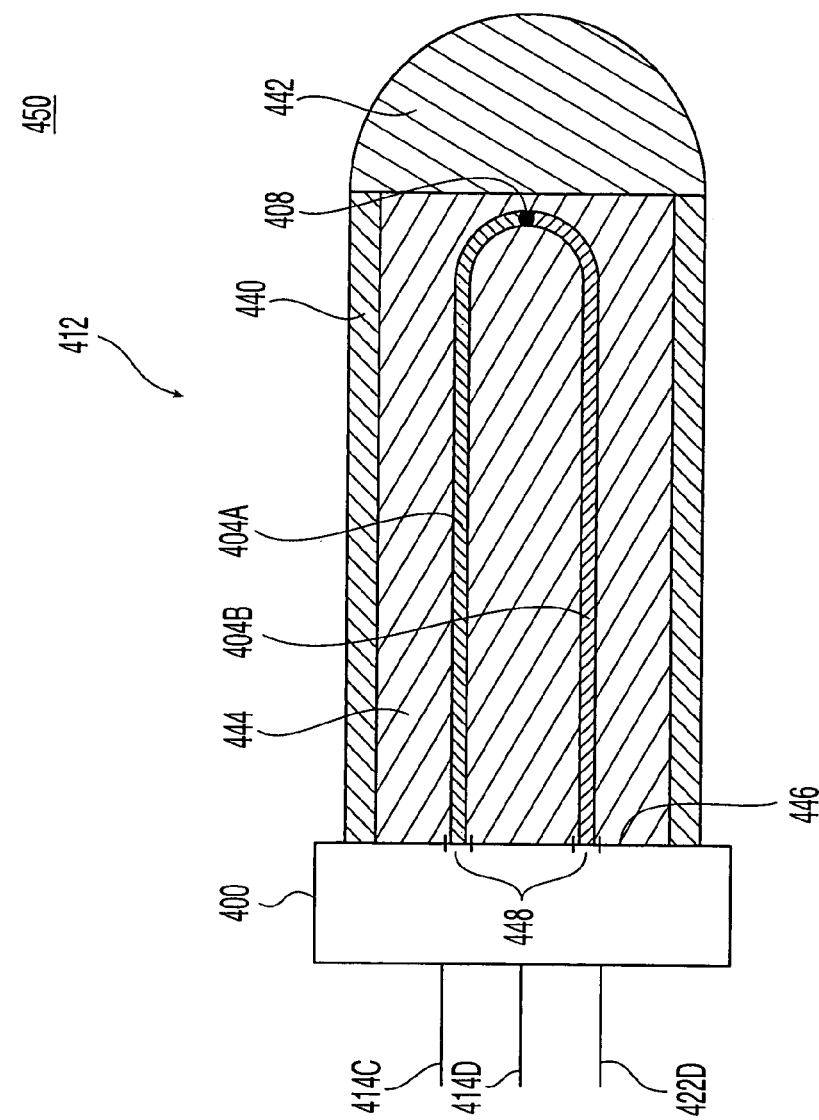
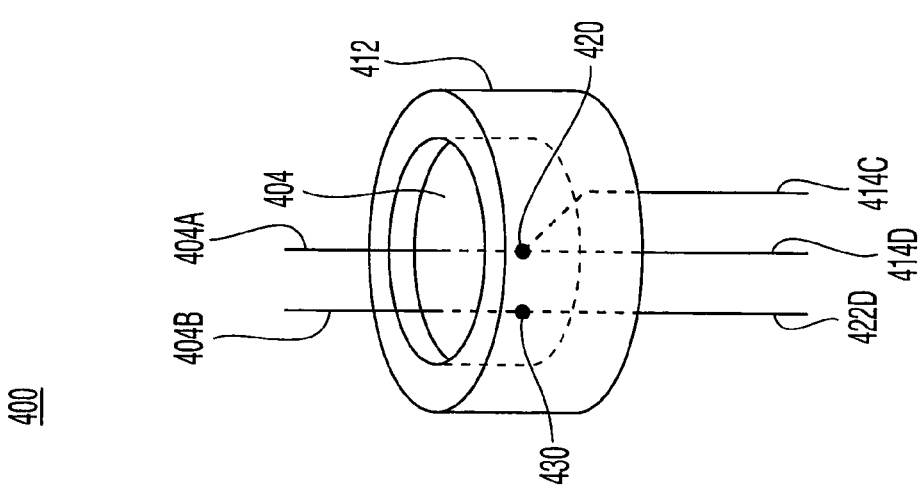
Fig. 4b
Fig. 4a

MULTI-ELEMENT THERMOCOUPLE

RELATED APPLICATIONS

The present invention is a Continuation of U.S. patent application Ser. No. 10/851,248, filed, May 24, 2004, now U.S. Pat. No. 7,044,638. The contents of aforementioned U.S. patent application Ser. No. 10/851,248 are incorporated by reference in their entirety.

FIELD OF THE INVENTION

The present invention is directed to thermocouples. More particularly, it is directed to multi-element thermocouple circuits and corresponding thermocouple assemblies capable of measuring high temperatures

BACKGROUND INFORMATION

Noble metal thermocouples, such as Type-R (Pt-13% Rh vs. Pt) and Type-S (Pt-10% Rh vs. Pt) thermocouples, among others, may be used for measuring hot gas temperatures in excess of 1300° C. For turbine applications, thermocouple probes typically are on the order of 10 cm–30 cm in length. Noble metal extension wires, thermoelectrically matched or compensating type to the thermoelements of such a thermocouple, may be used to bridge a distance between a distal end of the thermocouple and electrical circuitry configured to receive and process its output. The circuit extension may also include terminal connections to facilitate probe installation and maintenance.

Under certain conditions, it may become necessary to have very long extension wires. This may happen, for example, where the geometry and physical constraints of the object producing the hot gases to be measured, and the location within the object where these hot gases are accessible, are such that the electrical circuitry cannot be placed nearby. For noble metal thermocouples, the extension wires and terminal components may not be commercially available or cost prohibitive for the required length.

SUMMARY OF THE INVENTION

In one aspect, the present invention is directed to a multi-element thermocouple circuit. The circuit includes a first thermocouple comprising first and second thermoelements meeting at a first temperature measuring junction and having respective first and second distal ends, the first and second thermoelements being formed of respective first and second materials. It also includes a second thermocouple comprising third and fourth thermoelements meeting at a second temperature measuring junction that is connected to the first distal end, the third and fourth thermoelements having respective third and fourth distal ends and being formed of respective third and fourth materials, neither of said third and fourth materials being the same as either the first or second material. The circuit also includes a fifth thermoelement having a fifth proximal end connected to said second distal end and a fifth distal end, the fifth thermoelement being formed of a same material as the fourth thermoelement.

In one embodiment, each of the first and second thermoelements comprises a noble metal or a noble-metal alloy.

In another aspect, the present invention is directed to a parallel thermocouple circuit having a plurality of identical multi-element thermocouples as described above. In the parallel thermocouple circuit, the third thermoelements of all the multi-element circuits are connected to a first electrical terminal, the fourth thermoelements of all the multi-element circuits are connected to a second electrical terminal, and the fifth thermoelements of all the multi-element circuits are connected to a third electrical terminal.

In yet another aspect, the present invention is directed to a thermocouple probe. The probe includes a first thermocouple comprising first and second thermoelements meeting at a first temperature measuring junction, the first and second thermoelements being formed of respective first and second materials. The probe also includes a second thermocouple comprising third and fourth thermoelements meeting at a second temperature measuring junction that is connected to the first thermoelement, the third and fourth thermoelements being formed of respective third and fourth materials, neither of said third and fourth materials being the same as either said first or second material. The probe also includes a fifth thermoelement connected to the second thermoelement and being formed of the fourth material.

In yet another aspect, the present invention is directed to a thermocouple assembly comprising the above-described thermocouple probe detachably connected to a multi-conductor cable.

In still another aspect, the present invention is directed to a method for determining a temperature T2 of a turbine engine gas stream. The method includes exposing a first thermocouple to the turbine gas stream; exposing a second thermocouple to a transitional temperature T1 while shielding the second thermocouple from said turbine gas stream, detecting a first voltage difference associated with the first thermocouple, detecting a second voltage difference associated with the second thermocouple, estimating a transitional temperature T1 based on the first voltage difference, and estimating the turbine gas stream temperature T2 based at least in part on an estimated value of the transitional temperature T1 and the second voltage difference.

In yet another aspect, the present invention is directed to a method of controlling a turbine engine based on the estimated gas stream temperature T2.

BRIEF DESCRIPTION OF THE DRAWINGS

FIG. 4a shows a perspective view of a mating assembly in accordance with the present invention.

FIG. 4b shows a partial cross-sectional view of a thermocouple probe in accordance with the present invention.

DETAILED DESCRIPTION

Figure 1:
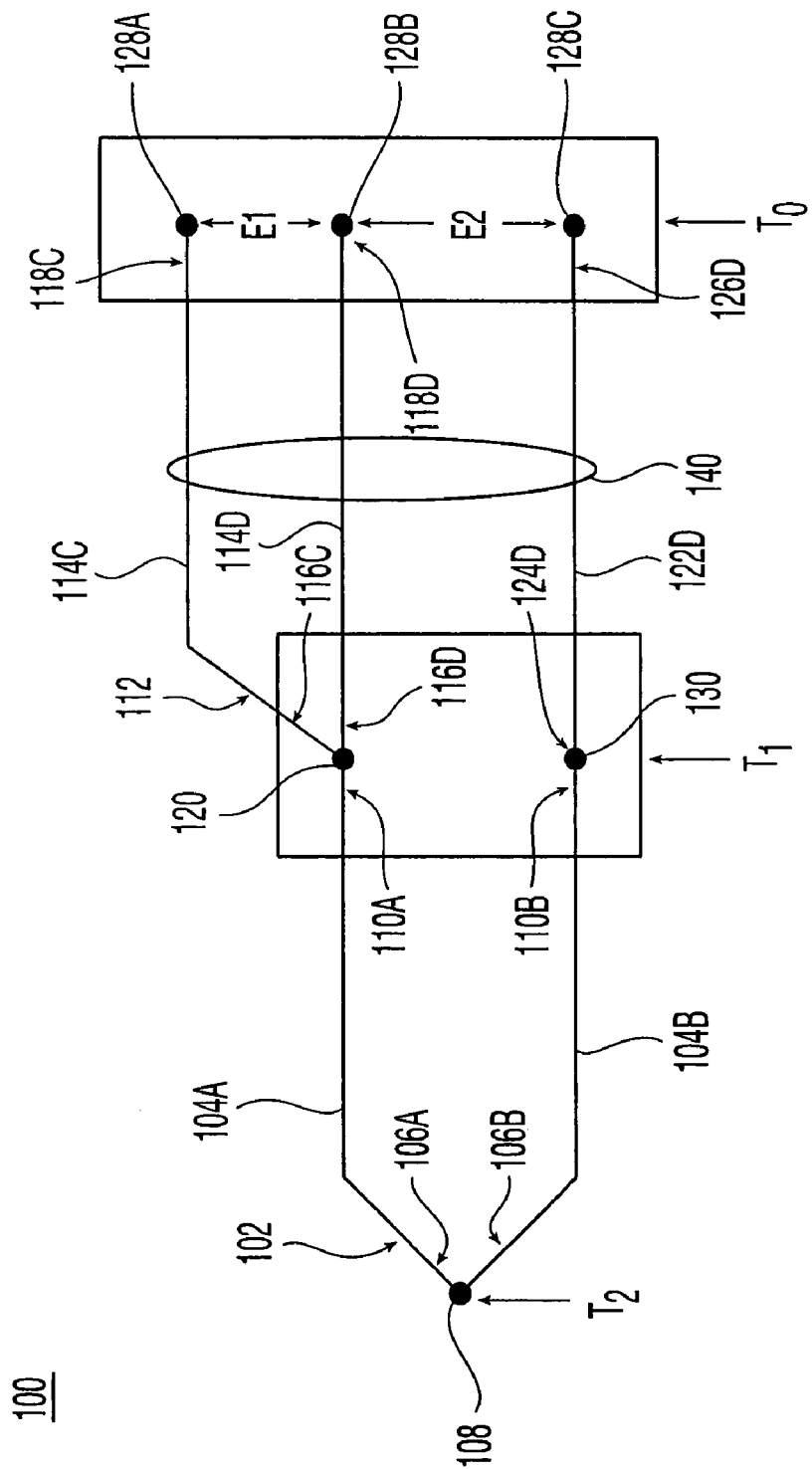
FIG. 1 shows one embodiment of a multi-element thermocouple circuit in accordance with the present invention.

FIG. 1 shows a multi-element thermocouple circuit 100 in accordance with the present invention. The thermocouple circuit 100 corresponds to a thermocouple assembly comprising two thermocouples 102, 112 with shared components.

The thermocouple circuit 100 includes a primary thermocouple 102 comprising a first thermoelement 104A and a second thermoelement 104B. Preferably, the first and second thermoelements each are a noble metal or a noble alloy. For example, the first thermoelement 104A (positive) may be a platinum-rhodium alloy and the second thermoelement 104B (negative) may be platinum.

In one embodiment the first and second thermoelements are part of an off-the-shelf Type-R thermocouple probe. In an alternate embodiment, the first and second thermoelements belong to a non-letter designated thermocouple. An example of this may be to have the first thermoelement formed of platinum and the second formed of palladium. In yet another embodiment, the first and second thermoelements are deposited on, and supported by, a thermally conductive and electrically non-conductive substrate. Regardless of how they are implemented, the first and second thermoelements preferably are less than 30 cm long and more preferably are less than 20 cm long.

The first and second thermoelements 104A, 104B, at respective proximal ends 106A, 106B thereof, meet at a first temperature measuring junction 108. During use, the temperature to be determined may be some very high, unknown temperature T2. Distal ends 110A, 110B of the first and second thermoelements 104A, 104B, respectively, are spaced apart from one another, and both preferably are at a same transition temperature T1.

The thermocouple circuit 100 also includes an auxiliary thermocouple 112 comprising a third thermoelement 114C and a fourth thermoelement 114D. Thus, it is noted that neither the third nor fourth thermoelements 114C, 114D is formed of the same material as the first thermoelement 104A. Preferably, too, neither the third nor fourth thermoelement is formed of the same material as the second thermoelement 104B. In a preferred embodiment the third and fourth thermoelements are part of a base metal type (e.g., Type-K or Type-T) thermocouple. Thus, the third thermoelement 114C (positive) may be KP material and the fourth thermoelement 114D (negative) may be KN material, in a Type-K implementation.

The thermoelements 114C, 114D, at respective proximal ends 116C, 116D thereof, meet at a second temperature measuring junction 120 where the temperature may be at the previously mentioned transition temperature T1. Distal ends 118C, 118D of the third and fourth thermoelements 114C, 114D, respectively, connect to first and second electrical terminals 128A, 128B, respectively. The electrical terminals 128A, 128B are spaced apart from one another and both preferably are at some known reference temperature T0.

During operation, the electrical terminals 128A, 128B define between them a first voltage difference E1 that is reflective of the temperature difference T1–T0. Therefore, the auxiliary thermocouple 112 is configured to provide information for determining the transition temperature T1, given the reference temperature T0 from:

$$E1 = S_{CD}(T1-T0); \text{ or} \qquad (Eq. 1)$$

$$T1 = T0 + \frac{E1}{S_{CD}} \qquad (Eq. 2)$$

where $S_{CD}$ is the mean relative Seebeck coefficient of materials 'C' and 'D' between temperatures T0 and T1, which in this instance correspond to the third 114C and fourth 144D thermoelements, respectively.

The thermocouple circuit 100 also includes a fifth thermoelement 122D that has the same length as, and is formed of the same material as, the fourth thermoelement 114D. Thus, fifth thermoelement 122D is formed of a material that is different from second thermoelement 104B. Fifth thermoelement 122D has a proximal end 124B that is connected to the second thermoelement 104B at junction 130, and a distal end 126D that is connected to a third electrical terminal 128C.

During operation, the second electrical terminal 128B and the third electrical terminal 128C define between them a second voltage difference E2 that is reflective of the temperature difference T2–T1. Therefore, the primary thermocouple 102 is configured to provide information that helps determine the unknown temperature T2 according to the following:

$$E2 = S_{AB}(T2-T1) + S_{DD}(T1-T0); \qquad (Eq. 3)$$

and if $S_{DD} = 0$; then $$E2 = S_{AB}(T2-T1), \text{ and} \qquad (Eq. 4)$$

$$T2 = T1 + \frac{E2}{S_{AB}} \qquad (Eq. 5)$$

where $S_{AB}$ is the mean relative Seebeck coefficient of materials 'A' and 'B' between temperatures T1 and T2, which in this instance correspond to the first 104A and second 104B thermoelements, respectively, and $S_{DD}$ is the mean relative Seebeck coefficient to account for the fourth 114D and fifth 122D thermoelements, respectively. However, the fourth 114D and fifth 122D thermoelements, which effectively serve as extension wires, do not need to be thermoelectrically matched with primary thermocouple 102 provided that they both are of identical composition, thereby justifying the assumption that $S_{DD}$ is indeed zero.

In actual practice, the calculation is more complicated than described since the relative Seebeck coefficient is a function of temperature. However, constructing a thermocouple assembly with standard thermocouple materials, such as described in ASTM E230, allows one to use industry accepted E(T) equations and related tolerances. An example output using a Type R (Pt-13Rh vs. Pt) hot section thermocouple and Type-K extension is shown in Table 1 below.

TABLE 1

Nominal output for Type R thermocouple with Type K Extension

| T0(° C.) | T1(° C.) | T2(° C.) | E1(mV) | E2(mV) |
|---|---|---|---|---|
| 20 | 150 | 900 | 5.340 | 8.164 |
|  |  | 1000 |  | 9.465 |
|  |  | 1100 |  | 10.809 |
|  |  | 1200 |  | 12.187 |
|  |  | 1300 |  | 13.588 |
|  | 200 | 900 | 7.340 | 7.736 |
|  |  | 1000 |  | 9.037 |
|  |  | 1100 |  | 10.381 |
|  |  | 1200 |  | 11.759 |
|  |  | 1300 |  | 13.160 |
|  | 250 | 900 | 9.355 | 7.282 |
|  |  | 1000 |  | 8.583 |
|  |  | 1100 |  | 9.927 |

TABLE 1-continued

Nominal output for Type R thermocouple with Type K Extension

| T0(° C.) | T1(° C.) | T2(° C.) | E1(mV) | E2(mV) |
|---|---|---|---|---|
| | | 1200 | | 11.305 |
| | | 1300 | | 12.706 |

Thus, upon detecting the voltages E1 and E2, one may use established equations and/or tables such as this one, to calculate and/or interpolate, as needed, to estimate the temperatures T1 and T2.

As seen in the circuit of FIG. 1, the third 114C and fourth 114D thermoelements belong to a first voltage difference subcircuit which produces the first voltage difference E1; the first 104A, second 104B, fourth 114D and fifth 122D thermoelements belong to a second voltage difference subcircuit which produces the second voltage difference E2. The distal ends of the third 114C, fourth 114D and fifth 122D thermoelements are sufficiently electrically isolated from one another to allow measurement of the first open circuit voltage difference E1 between the third 114C and fourth 114D thermoelements and allow measurement of the second open circuit voltage difference E2 between the fourth 114D and fifth 122D thermoelements. Significantly, the fourth 114D thermoelement is common to the two voltage difference subcircuits. The third 114C, fourth 114D and fifth 122D thermoelements preferably comprise conductors, such as 20 AWG wire, individually insulated and bundled together as a multi-wire flexible cable 140 extending between their proximal and distal ends. And since the fourth and fifth thermoelements preferably are formed of the same material, the multi-wire cable has first and second identical conductors, and a third conductor formed of a different material that is suitable for forming a thermocouple (e.g., Type-K or type-T) with one of the two identical conductors.

The length of third 114C, fourth 114D and fifth 122D thermoelements, which effectively serve as extension wires, preferably is anywhere from less than 20 cm to several meters. The resulting thermocouple assembly thus is suitable for measuring a high, unknown temperature T2 by making two voltage measurements, using a primary thermocouple 102 that is cascaded, via its first thermoelement 104A, with an auxiliary thermocouple 112 configured to measure a transition temperature T1.

The thermocouple assembly may thus be used to measure temperatures with the primary thermocouple 102 proximate to the hostile environment, and the auxiliary thermocouple extending from a leg of the primary thermocouple to a remote location where the electrical connectors 128A, 128B & 128C are situated. This allows one to use readily available base metal extension wires and connectors, which provides cost advantages when using a noble metal primary thermocouple. Such base metal extension also allows one to use non-letter designated noble metal primary thermocouples in situations where matched lead wires and connectors are not available.

In a preferred embodiment, the second temperature measuring junction 120 and junction 130, where the second 104B and fifth 122D thermoelements meet, preferably are both at the same transition temperature T1. In one embodiment, the junctions 120, 130 simply may be positioned close to one another to help ensure that they experience the same transition temperature T1. In another embodiment, in addition to simply being proximate to one another, a mating assembly 132 is provided that supports portions of one or more of the first through fifth thermoelements. More preferably, the mating assembly is such that the two junctions 120, 130 are electrically isolated from one another, yet are still in thermal communication with each other so that they can experience a common temperature T1.

The electrical terminals 128A, 128B & 128C, at which the distal ends of the third 114C, fourth 114D and fifth 122D thermoelements terminate, preferably are all at a same, known, reference temperature T0. In one embodiment, the electrical terminals are mounted on a termination strip 134. The temperature of the termination strip 134 may be temperature controlled to maintain the termination strip at a predetermined reference temperature T0. Alternatively, or in addition, an auxiliary thermometer may be used to gauge the temperature at the terminals, and the output of this thermometer is used as the reference temperature T0 in the equations above to determine the temperature T2 at the first temperature measuring junction 108.

During use, the electrical terminals 128A, 128B & 128C provide the voltage differences E1 & E2 to additional electrical circuitry, known to those skilled in the art. This additional circuitry may, among other things, sense the voltage difference and convert it into analog and/or digital signals, at least one of which preferably carries information that is proportional to temperature T2 for further processing. Thus, a processor associated with this circuitry may be configured to use one E1 to determine the transition temperature T1 and, from that, the temperature T2. The temperature T2, which is then determined as a function of time, may then be used to provide real-time control of the equipment creating that temperature.

Figure 2:
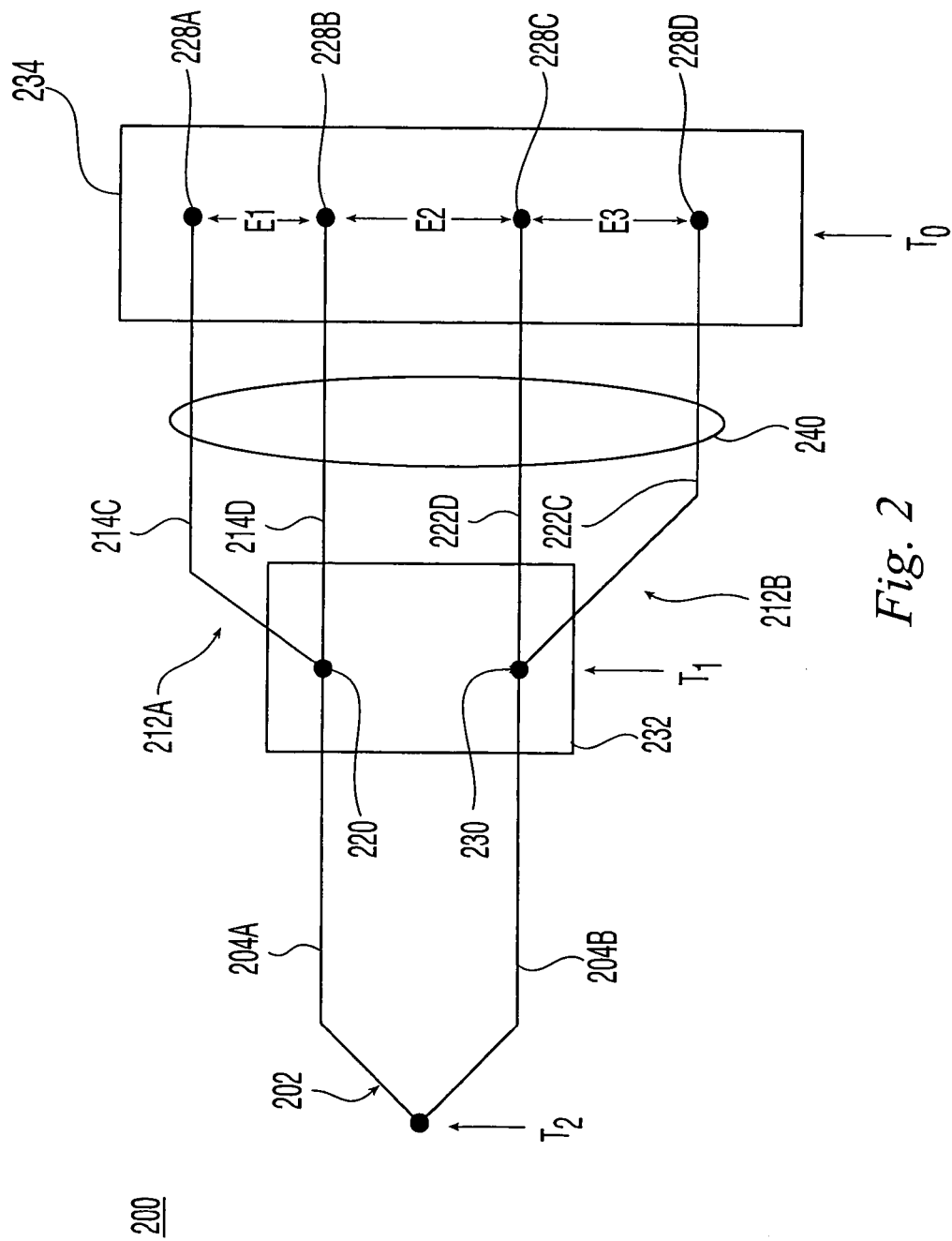
FIG. 2 shows a second embodiment of a multi-element thermocouple circuit in accordance with the present invention.

FIG. 2 shows an alternate embodiment of a multi-element thermocouple circuit 200 in accordance with the present invention. The principal difference between thermocouple circuit 100 and thermocouple circuit 200 is that the latter is provided with identical, first and second auxiliary thermocouples 212A, 212B, respectively, configured to measure temperature T1 at respective second 220 and third 230 temperature measuring junctions associated with mating assembly 232. Thus, multi-element thermocouple circuit 200 comprises a primary thermocouple 202 to whose first and second thermoelements 204A, 204B, respectively, the first 212A and second 212B auxiliary thermocouples are connected in a cascaded fashion.

As seen in FIG. 2, primary thermocouple comprises first thermoelement 204A formed from a first material, and second thermoelement 204B formed from a second material. Furthermore, first auxiliary thermocouple 212A comprises third thermoelement 214C and fourth thermoelement 214D, while second auxiliary thermocouple 212B comprises fifth thermoelement 222D and sixth thermoelement 222C which meet at third temperature measuring junction 230. It is understood that the third and sixth thermoelements 214C, 222C are both formed of a third material and have the same length, while fourth and firth thermoelements 214D, 222D are both formed of a fourth material and also have the same length.

In a preferred embodiment, thermoelements 214C, 214D, 222C & 222D all comprise conductors bundled together in a multi-wire cable 240 extending between their proximal and distal ends. And since the third 214C and sixth 222C thermoelements are formed of the same, third material while fourth 214D and fifth 222D thermoelements are formed of the same, fourth material, the cable 140 has two pairs of identical conductors formed of material suitable for implementing a pair of identical thermocouples (e.g., Type-K or Type-T). The distal ends of thermoelements 214C, 214D, 222D & 222C connect to electrical terminals 228A, 228B, 228C & 228D, respectively, which are associated with termination strip 234.

During use, the first auxiliary thermocouple 212A outputs a voltage difference E1 that is reflective of temperature T1, while the second auxiliary thermocouple 212B outputs a voltage difference E3 that is also reflective of temperature T1. The two values E1 and E3 may both be used to provide redundant T1 estimates. Alternatively, the individual junction temperatures may be used to calculate T2 using absolute Seebeck coefficients for thermoelements 204A, 204B, 214D and 222D.

Figure 3:
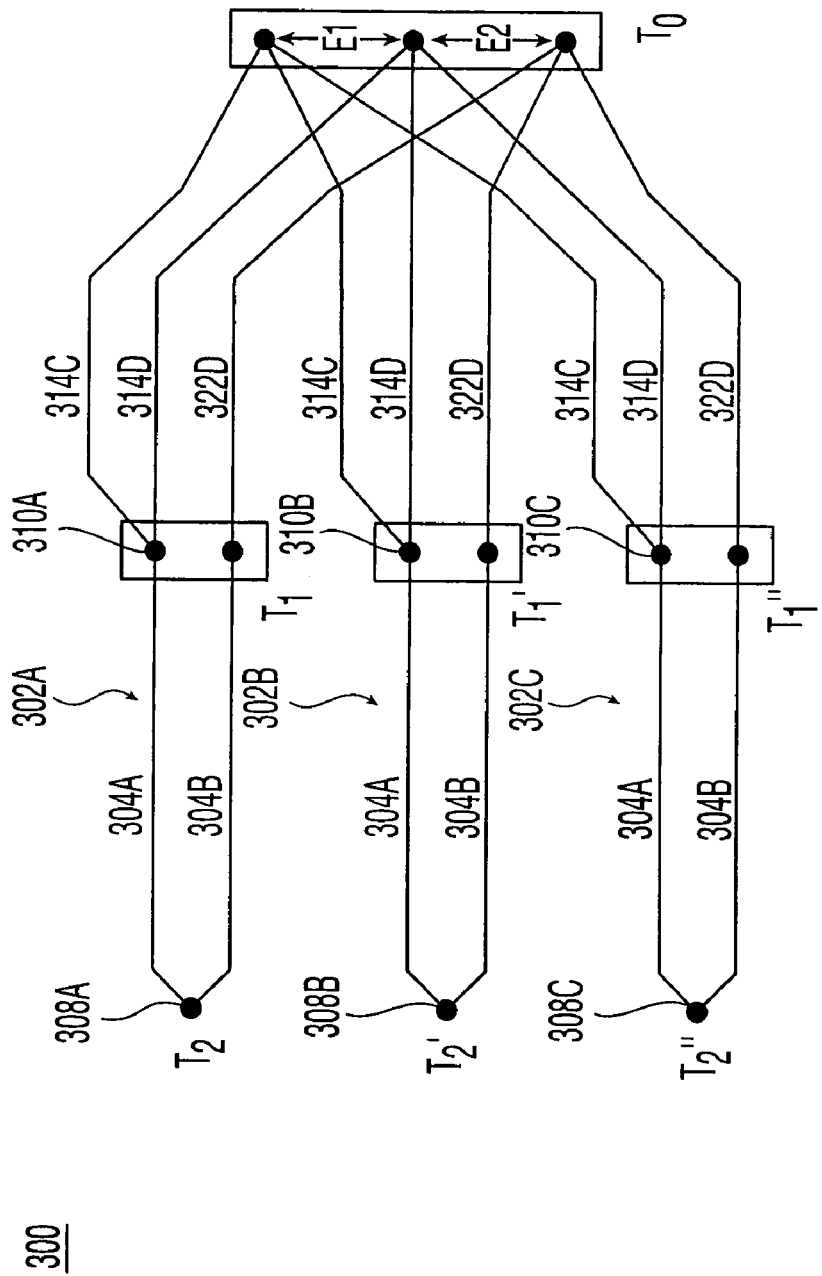
FIG. 3 shows a parallel thermocouple circuit in accordance with the present invention.

FIG. 3 shows a parallel thermocouple circuit 300 that is configured to detect the temperature at a plurality of locations. Such an arrangement can be especially advantageous when one wishes to measure the temperature at a plurality of locations, all associated with the same heat source. An example of this may arise in turbine application where one may wish to mount temperature probes circumferentially around a hot section of an engine.

The parallel thermocouple circuit 300 has a plurality of identical multi-element thermocouple circuits 302A, 302B, 302C arranged in electrical parallel with one another, each being in accordance with the multi-element thermocouple circuit 100 of FIG. 1. As seen in FIG. 3, the parallel thermocouple circuit 300 has three first temperature measuring junctions 308A, 308B, 308C formed by the juncture of three first thermoelements 304A with three second thermoelements 304B, for measuring temperatures T2, T2', T2", respectively.

The parallel thermocouple circuit 300 also has three second temperature measuring junctions 310A, 310B, 310C, for measuring transition temperatures T1, T1', T1", respectively. All of the third thermoelements 314C connect to first electrical terminal 328A; all of the fourth thermoelements 314D connect to the second electrical terminal 328B; and all of the fifth thermoelements 322D connect to the third electrical terminal 328C.

During operation, the voltage difference E1 between first 328A and second 328B electrical terminals is reflective of an average of temperatures T1, T1', T1". Similarly, voltage difference E2 between second 328B and third 328C electrical terminals is reflective of an average of temperatures T2, T2', T2". For E1 and E2 to reflect the average temperatures, however, the loop resistance paths for the parallel circuits should be equal, and so the various thermoelements should be replicated in each of the multi-element thermocouple circuits 302A, 302B, 302C.

It is understood that the parallel thermocouple circuit 300 corresponds to a thermocouple assembly comprising three multi-element thermocouples that share electrical terminals 328A, 328B and 328C. It is further understood that while FIG. 3 shows a multi-thermocouple circuit having three multi-element thermocouples, a different number, such as 2, 4, 5, etc., of multi-element thermocouples may likewise be connected in parallel.

FIG. 4a shows a perspective, stylized view of a mating assembly 400 in accordance with the present invention. It is understood that the mating assembly 400 may be part of a thermocouple probe assembly, being fixed to such a thermocouple's distal end, as seen in FIG. 4b. The mating assembly may even have an exterior that is formed of the same material as the outer sheath of the thermocouple, and manufactured continuously therewith. The mating assembly 400 preferably has a hollow metallic cylindrical body 412, receives first 404A and second 404B thermoelements, and has third 414C, fourth 414D and fifth 422D thermoelements emerging therefrom. A material 404 into which at least portions of some of the thermoelements extend, is present in the cylindrical body. The second temperature measuring junction 420 where the third 414C and fourth 414D thermoelements join, and a junction 430 where the second 404B and fifth 422D thermoelements meet are also associated with the mating assembly.

FIG. 4b shows a thermocouple probe 450 in accordance with an embodiment of the present invention. The primary thermocouple 412 has an outer cylindrical sheath 440 and an end closure 442 formed of the same material at the proximal end of the probe 450. Within the cylindrical sheath 440 are the first thermoelement 404A and the second thermoelement 440B, each of which preferably also is formed of a noble metal or noble metal alloy, as discussed above. The sheath 440 and end closure 442 preferably are formed of materials very similar to the thermoelements they enclosed. Thus, if the first thermoelement 404A is a platinum-rhodium alloy and the second thermoelement is platinum, the sheath and end cap may, for instance, be formed of a platinum alloy. Preferably, the sheath and end cap are oxide-dispersion strengthened with zirconium oxide or yttrium oxide, or the like, to prevent large grains from forming therein under the stress of high temperature.

The first and second thermoelements 404A, 404B, which meet at the first temperature measuring junction 408 proximate to the end closure 442, are embedded in an electrically non-conductive and thermally insulative material 444 such as high purity magnesium oxide or aluminum oxide. The insulative material 444 should be non-reactive at the high temperatures to which the probe 450 would likely be exposed, thereby avoiding contamination within the probe. A base cap 446 is provided with openings 448 through which distal portions of the first and second thermoelements 404A, 404B exit into the mating assembly 400. The mating assembly 400 may be implemented in a one of a number of ways, as discussed next, such that third, fourth and fifth thermoelements 414C, 414D, 422D emerge therefrom.

Figure 5B:
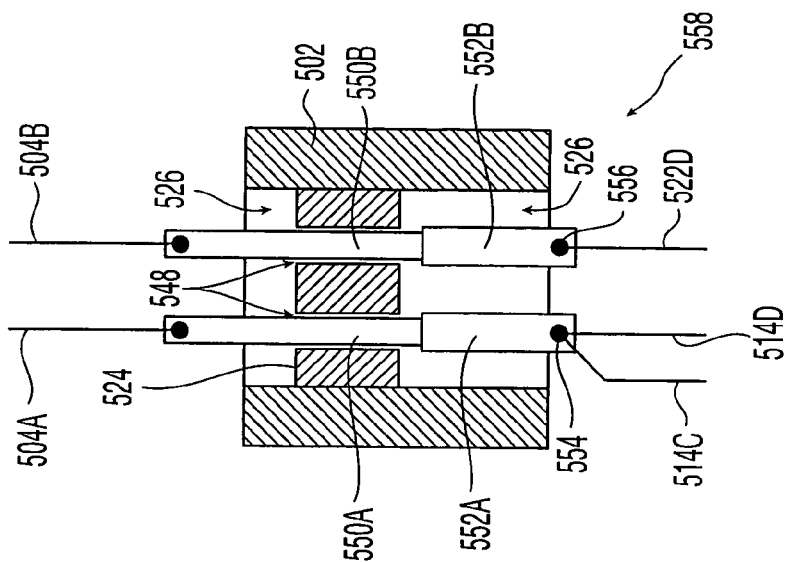
FIGS. 5a–5d shows cross-sectional views of various mating assembly embodiments.
Figure 5A:
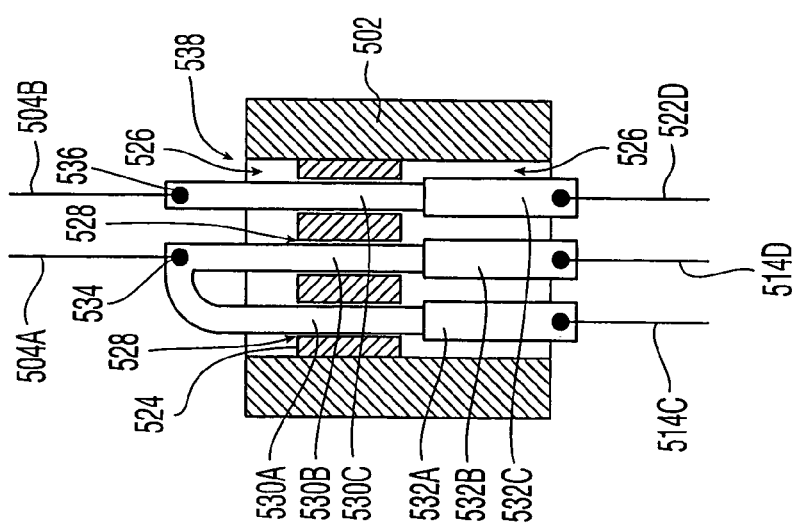

FIG. 5a shows a vertical cross-section of one embodiment of a mating assembly 520. Mating assembly 520 has a disc-shaped plug 524 positioned in the hollow cavity 526 defined by the cylindrical wall 502 of the assembly. The plug is preferably a ceramic or glass material with high resistivity for electrical isolation and high thermal conductivity to promote temperature uniformity within the mating assembly. Three holes 528 are formed in the plug 524 to accommodate pins 530A, 530B, 530C. The pins 530A, 530B, 530C are detachably connected to sockets 532A, 532B, respectively. Second temperature measuring junction 534, and junction 536 where second thermoelement 504B and fifth thermoelement 522D meet, are both on the upstream side 538 of the mating assembly 520, and so these junctions would be inside a probe. It is therefore understood that pin 530A and socket 532A preferably are formed of the same material as third thermoelement 514C, while pins 530B & 530C and sockets 532B & 532C preferably are all formed of the same material as the fourth 514D and fifth 522D thermoelements.

FIG. 5b shows a vertical cross-section of a second embodiment of a mating assembly 540. Mating assembly 540 also has a disc-shaped plug 524 of the sort seen in mating assembly 520 discussed above. Two holes 548 are formed in the plug 524 to accommodate pins 550A, 550B. The pins 550A, 550B are detachably connected to sockets 532A, 532B, 532C, respectively. Second temperature measuring junction 554, and junction 556 where second thermoelement 504B and fifth thermoelement 522D meet, are both on the downstream side 558 of the mating assembly 540 as so these junctions would be outside a probe. It is therefore understood that pin 550A and socket 552A preferably are formed of the same material as the first thermoelement 504A, while pin 550B and socket 552B preferably are all formed of the same material as the second thermoelement 504B.

Figure 5D:
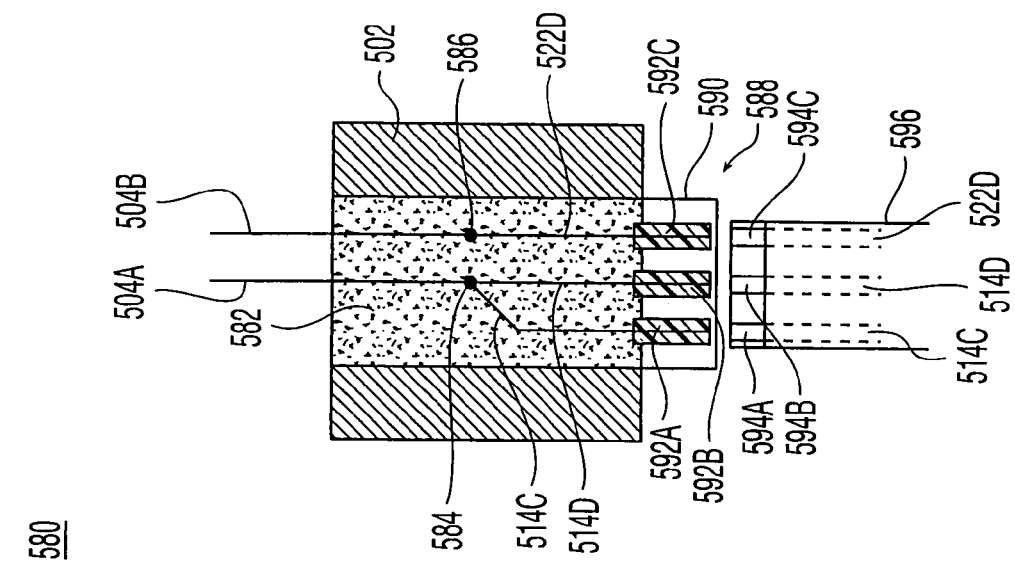
Figure 5C:
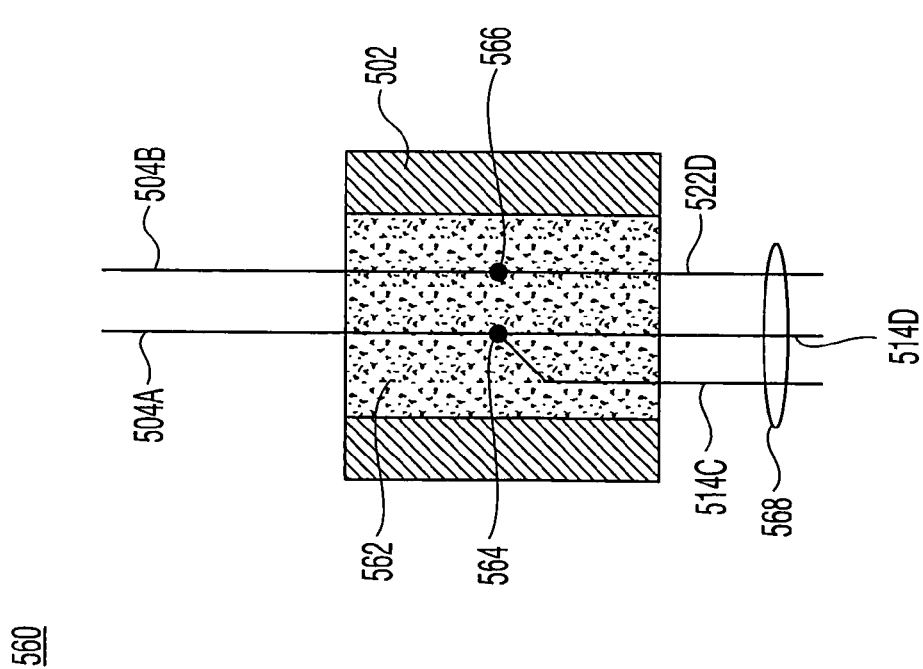

FIG. 5c shows a vertical cross-section of a mating assembly 560 having a solid core 562 formed from an electrically insulating potting material, such as a high-temperature cement. The temperature measuring junction 564 is embedded within this core, as is a second junction 566 where the second 504B and the fifth 522D thermoelements meet. In this embodiment, a downstream portion of each of thermoelements 514C, 514D and 522D is permanently fixed to the core 562, the three downstream portions terminating, at a free end thereof, in a pigtail assembly 568. As is known to those skilled in the art, the pigtail assembly 568 may connect to another cable, much as seen in mating assembly 580 described below. It is understood that such a cable, and any connectors between the pigtail assembly and the cable, are formed of the same material as the thermoelements to which they connect.

FIG. 5d shows a vertical cross-section of yet another mating assembly 580, again having a solid core 582 formed from a electrically insulating potting material, such as a high-temperature cement. The temperature measuring junction 584 is embedded within this core, as is a second junction 586 where the second 504B and the fifth 522D thermoelements meet. In this embodiment, the downstream end 588 of the mating assembly 580 is provided with a connector assembly 590 comprising first connectors 592A, 592B, 592C at which the third 514C, fourth 514D and fifth 522D thermal elements respectively terminate. First connectors 592A, 592B and 592C are configured and dimensioned to mate with complementary second connectors 594A, 594B and 594C, respectively, which are part of cable 596, to thereby continue the third 514C, fourth 514D and fifth 522D thermal elements. It is understood that the connectors are formed of the same material as the thermoelements to which they connect.

Figure 6:
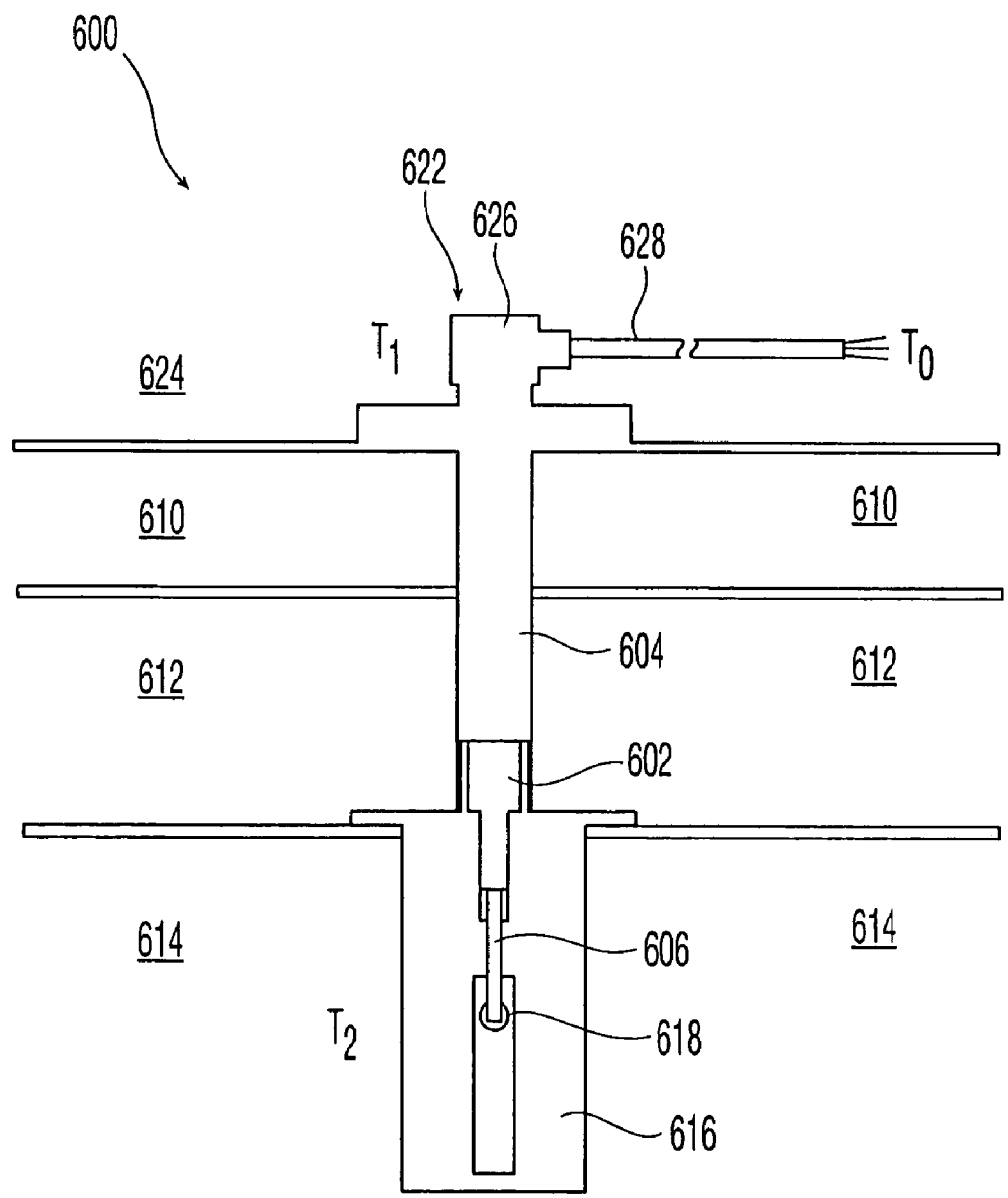
FIG. 6 shows a thermocouple assembly in accordance with the present invention configured to measure gases in a turbine engine.

FIG. 6 shows a partial cross-section of a gas turbine engine 600 having a thermocouple probe 602 in accordance with the present invention at least partially installed in a tubular housing 604. The turbine engine 600 has an outer fan region 610, an inner fan region 612 and an exhaust region 614 that is at some time-varying temperature T2. A stator vane 616 that extends into the gas path 614 is provided with an airflow hole 618 that is in communication with the hot gas. The probe 602 is provided with a mating assembly 626 and has a tip 606 that extends into the airflow hole 618.

The distal end 622 of the probe 602 extends into the bay 624 or other general area in which the turbine engine 600 is situated. A mating assembly 626 connected to the probe 602 is located in the bay 624 and is exposed to the transitional temperature T1 of the bay 624, but is shielded from the hot turbine gas by the various turbine structures. A flexible cable 628 then connects the mating assembly 626 to the necessary electrical circuitry for detecting the voltages and determining temperature T1 and T2.

Thus, in accordance with the present invention, a method for determining a temperature T2 of turbine engine gas includes exposing a first thermocouple to the turbine gas; exposing a second thermocouple to a transitional temperature T1 while shielding the second thermocouple from said turbine gas, detecting first and second voltage differences associated with corresponding first and second thermocouples, estimating a transitional temperature T1 based on the first voltage difference, and estimating the turbine gas temperature T2 based at least in part on an estimated value of the transitional temperature T1 and the second voltage difference, wherein the first and second thermocouples are of different types.

Another method for determining a temperature T2 of turbine engine gas includes exposing a first thermocouple to the turbine gas; exposing a second thermocouple to a transitional temperature T1 while shielding the second thermocouple from said turbine gas, detecting first and second voltage differences associated with corresponding first and second thermocouples, estimating a transitional temperature T1 based on the first voltage difference, and estimating the turbine gas temperature T2 based at least in part on an estimated value of the transitional temperature T1 and the second voltage difference, wherein at least a portion of an extension wire of a thermoelement of the first thermocouple also serves as a thermoelement of the second thermocouple.

Figure 7:
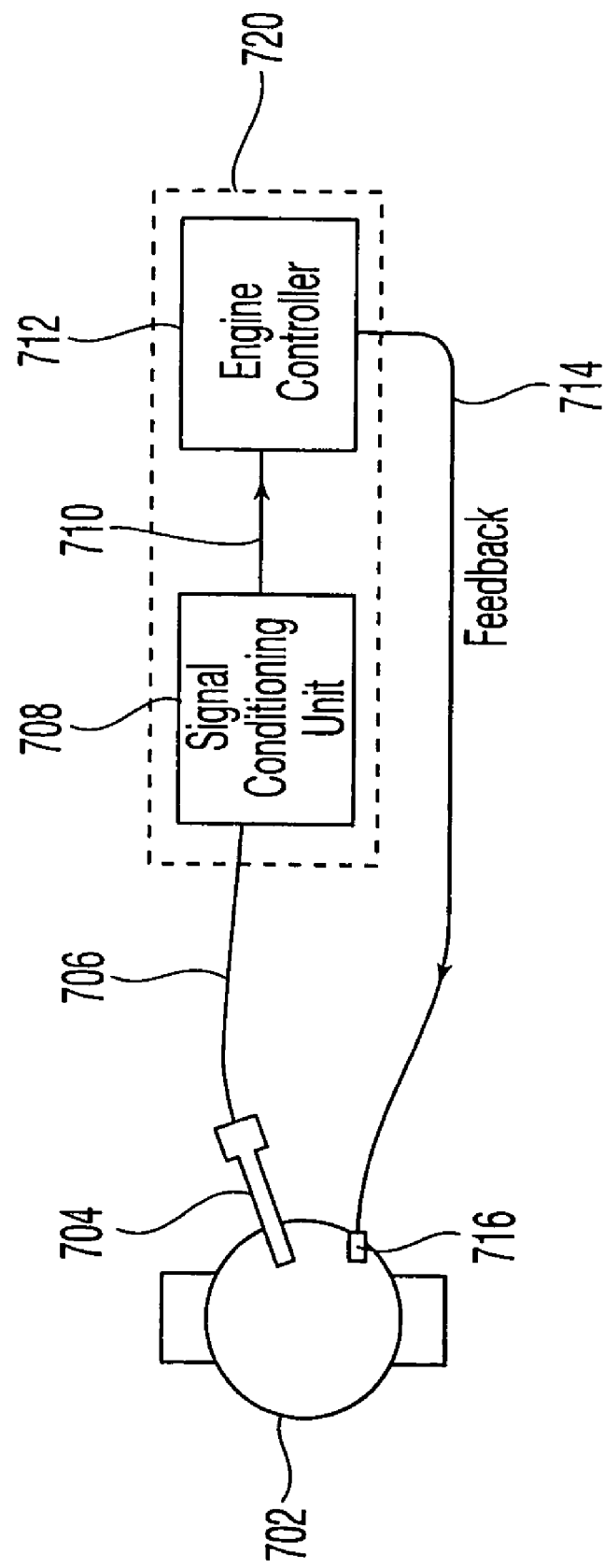
FIG. 7 shows a control system employing a thermocouple assembly in accordance with the present invention.

FIG. 7 shows a feedback loop 700 that controls operation of a turbine engine 702 using a thermocouple probe 704 in accordance with the present invention. Thermocouple probe 704 may be a probe such as that seen in FIG. 4b, equipped with one of the mating assemblies of FIGS. 5a–5d. A cable 706 in which the third, fourth and firth thermoelements are bundled connects the distal end of the probe 70 to a signal conditioning unit 708.

The signal conditioning unit 708 detects the voltages E1 & E2, estimates a temperature T2 of the turbine gas associated with the turbine engine 702, and outputs a signal 710 that preferably is proportional to this gas temperature. Thus, the signal conditioning unit 708 includes circuitry for detecting the voltages and converting them as appropriate into analog or digital form, and a processor configured to accept the analog or digital form of this voltage information and estimate the temperature T2, in a manner discussed above. Thus, the processor of the signal conditioning unit has one or more associated memories for storing data of the sort seen in Table 1 along with software to interpolate values, and/or software to implement any necessary calculations to arrive at the required estimates.

The signal 710 output by the signal conditioning unit 708 is then applied as input to an engine controller 712 which compares the estimated temperature T2 with reference values and, as needed, outputs a feedback signal 714 that adjusts operation of the turbine engine 702. Thus, the feedback signal 714 may be used to control one or more valves, solenoids, actuators, motors, or the like, to adjust fuel intake, air intake, or other physical parameters, depending on the turbine engine design. It is understood that the signal conditioning unit 708 and the engine controller 712 may be integrated into a single device 720 that performs both functions.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A multi-element thermocouple circuit comprising:
   a first thermocouple comprising first and second thermoelements meeting at a first temperature measuring junction and having respective first and second distal ends, said first and second thermoelements being formed of respective first and second materials;

a second thermocouple comprising third and fourth thermoelements meeting at a second temperature measuring junction that is connected to said first distal end, said third and fourth thermoelements having respective third and fourth distal ends and being formed of respective third and fourth materials, neither of said third and fourth materials being the same as said first material; and a fifth thermoelement having a fifth proximal end connected to said second distal end and a fifth distal end, the fifth thermoelement being formed of said fourth material; wherein:

the fourth thermoelement is common to two voltage difference subcircuits; and the distal ends of the third, fourth and fifth thermoelements are connected to first, second and third electrical terminals, respectively, such that a first voltage difference is defined between the first and second electrical terminals, and a second voltage difference is defined between the second and third electrical terminals.

2. The multi-element thermocouple circuit according to claim 1, wherein neither of the third and fourth materials is the same as the second material.

3. The multi-element thermocouple circuit according to claim 1, wherein the fifth thermoelement is the same length as the fourth thermoelement.

4. The multi-element thermocouple circuit according to claim 1, wherein:
the first thermocouple is a type-R thermocouple; and
the second thermocouple is a type-K or a type-T thermocouple.

5. The multi-element thermocouple circuit according to claim 1, wherein:
the first temperature measuring junction is at some temperature T2;
the second temperature measuring junction is at some temperature T1;
the third, fourth and fifth distal ends are at some known reference temperature T0;
the third and fourth distal ends have a first voltage difference of E1 between them;
the fourth and fifth distal ends have a second voltage difference of E2 between them; and
the temperature T2 at the first measuring junction can be estimated from E1 and E2.

6. The multi-element thermocouple circuit according to claim 1, further comprising a mating assembly having a first mating junction for connecting the first distal end to the second temperature measuring junction and a second mating junction for connecting the second distal end to the fifth proximal end.

7. The multi-element thermocouple circuit according to claim 6, wherein the mating assembly is configured to electrically isolate the first mating junction from the second mating junction and promote thermal conduction between the first and second mating junctions.

8. The multi-element thermocouple circuit according to claim 1, comprising a multi-wire cable that includes at least portions of the third, fourth and fifth thermoelements.

9. The multi-element thermocouple circuit according to claim 1, further comprising a sixth thermoelement formed of said third material, said sixth thermoelement and said fifth thermoelement meeting at a third temperature measuring junction to thereby form a third thermocouple.

10. A parallel thermocouple circuit comprising a plurality of identical multi-element thermocouple circuits, each of said multi-element thermocouple circuits comprising:

a first thermocouple comprising first and second thermoelements meeting at a first temperature measuring junction and having respective first and second distal ends, said first and second thermoelements being formed of respective first and second materials;

a second thermocouple comprising third and fourth thermoelements meeting at a second temperature measuring junction that is connected to said first distal end, said third and fourth thermoelements having respective third and fourth distal ends and being formed of respective third and fourth materials, neither of said third and fourth materials being the same as said first material; and a fifth thermoelement having a fifth proximal end connected to said second distal end and a fifth distal end, the fifth thermoelement being formed of said fourth material;

wherein:

the third thermoelements of all of said plurality of identical multi-element circuits are connected to a first electrical terminal;

the fourth thermoelements of all of said plurality of identical multi-element circuits are connected to a second electrical terminal; and the fifth thermoelements of all of said plurality of identical multi-element circuits are connected to a third electrical terminal.

11. The parallel thermocouple circuit according to claim 10, wherein:
neither of the third and fourth materials is the same as the second material; and
the fifth thermoelement is the same length as the fourth thermoelement.

12. A thermocouple probe comprising:
a first thermocouple comprising first and second thermoelements meeting at a first temperature measuring junction, said first and second thermoelements being formed of respective first and second materials;

a second thermocouple comprising third and fourth thermoelements meeting at a second temperature measuring junction that is connected to the first thermoelement, said third and fourth thermoelements being formed of respective third and fourth materials, neither of said third and fourth materials being the same as said first material; and a fifth thermoelement connected to said second thermoelement and being formed of said fourth material; wherein:

the fourth thermoelement is common to two voltage difference subcircuits; and the third, fourth and fifth thermoelements are connected to first, second and third electrical terminals, respectively, such that a first voltage difference is defined between the first and second electrical terminals, and a second voltage difference is defined between the second and third electrical terminals.

13. The thermocouple probe according to claim 12, wherein:
neither of the third and fourth materials is the same as the second material; and
the fifth thermoelement is the same length as the fourth thermoelement.

14. The thermocouple probe according to claim 12, further comprising:
a mating assembly into which the first and second thermoelements are received, and from which the third, fourth and fifth thermoelements emerge.

15. The thermocouple probe according to claim 13, wherein the mating assembly comprises an electrically nonconductive plug through which the third, fourth and fifth thermoelements pass, the second temperature measuring junction being located on an upstream side of the plug.

16. The thermocouple probe according to claim 13, wherein the mating assembly comprises an electrically nonconductive plug through which the first and second thermoelements pass, the second temperature measuring junction being located on a downstream side of the plug.

17. The thermocouple probe according to claim 13, wherein the mating assembly comprises an electrically insulating potting material, said second temperature measuring junction being embedded in said electrically insulating potting material.

18. The thermocouple probe according to claim 16, comprising a pigtail assembly provided on a downstream side of the potting material.

19. A thermocouple assembly comprising:
   a thermocouple probe comprising:
      a first thermocouple comprising first and second thermoelements meeting at a first temperature measuring junction, said first and second thermoelements being formed of respective first and second materials;
      a second thermocouple comprising third and fourth thermoelements meeting at a second temperature measuring junction that is connected to the first thermoelement, said third and fourth thermoelements being formed of respective third and fourth materials, neither of said third and fourth materials being the same as said first material; and
      a fifth thermoelement connected to said second thermoelement and being formed of said fourth material; and
   a cable detachably connected to said third, fourth and fifth thermoelements of said thermocouple probe, said cable comprising first and second conductors formed of said fourth material and connected to said fourth and fifth thermoelements, and a third conductor formed of said third material and connected to said third thermoelement; wherein:
      the third, fourth and fifth thermoelements are connected to first, second and third electrical terminals, respectively, such that a first voltage difference is defined between the first and second electrical terminals, and a second voltage difference is defined between the second and third electrical terminals.

20. The multi-element thermocouple circuit according to claim 19, wherein:
   neither of the third and fourth materials is the same as the second material; and
   the fifth thermoelement is the same length as the fourth thermoelement.

21. The thermocouple assembly according to claim 19, wherein the fourth thermoelement is common to two voltage difference subcircuits.

22. A method of measuring a temperature at a first temperature measuring junction, comprising:
providing a thermocouple probe comprising:
   a first thermocouple comprising first and second thermoelements meeting at a first temperature measuring junction, said first and second thermoelements being formed of respective first and second materials;
   a second thermocouple comprising third and fourth thermoelements meeting at a second temperature measuring junction that is connected to the first thermoelement, said third and fourth thermoelements being formed of respective third and fourth materials, neither of said third and fourth materials being the same as said first material; and
   a fifth thermoelement connected to said second thermoelement and being formed of said fourth material; wherein:
   the fourth thermoelement is common to two voltage difference subcircuits;
measuring a first voltage difference between the third and fourth thermoelements;
measuring a second voltage difference between the fourth and fifth thermoelements; and
determining the temperature at the first temperature measuring junction based at least in part on the first and second voltage differences.

23. A multi-element thermocouple circuit comprising:
a first thermocouple comprising first and second thermoelements meeting at a first temperature measuring junction and having respective first and second distal ends, said first and second thermoelements being formed of respective first and second materials;
a second thermocouple comprising third and fourth thermoelements meeting at a second temperature measuring junction that is connected to said first distal end, said third and fourth thermoelements having respective third and fourth distal ends and being formed of respective third and fourth materials, neither of said third and fourth materials being the same as said first material; and
a fifth thermoelement having a fifth proximal end connected to said second distal end and a fifth distal end, the fifth thermoelement being formed of said fourth material; wherein:
the fourth thermoelement is common to two voltage difference subcircuits; and
the distal ends of the third, fourth and fifth thermoelements are sufficiently electrically isolated from one another such that, when measuring a temperature at the first temperature measuring junction, a first open circuit voltage appears across distal ends of the third and fourth thermoelements and a second open circuit voltage appears across distal ends of the fourth and fifth thermoelements.

\* \* \* \* \*